United States Patent [19]

Lumpp et al.

[11] 4,247,163
[45] Jan. 27, 1981

[54] CLAMP CONSTRUCTION

[75] Inventors: Robert E. Lumpp, Addison; Mark Margolin, Chicago, both of Ill.

[73] Assignee: TRW Inc., Elk Grove Village, Ill.

[21] Appl. No.: 943,336

[22] Filed: Sep. 18, 1978

[51] Int. Cl.³ .................... G02B 5/16; F16G 11/00
[52] U.S. Cl. ........................ 350/96.21; 24/115 R; 24/115 G; 24/132 R; 174/191; 174/197
[58] Field of Search ............. 350/96.20, 96.21, 96.22; 174/191, 197; 285/125, 236, 242, 243, 420; 24/115 R, 115 G, 120, 128, 130, 132 R, 132 WL, 134 N

[56] References Cited

U.S. PATENT DOCUMENTS

| 3,946,467 | 3/1976 | Lukas et al. | 350/96.20 |
| 3,966,299 | 6/1976 | Osterfield et al. | 350/96.21 |
| 3,982,060 | 9/1976 | Avery et al. | 350/96.20 |

FOREIGN PATENT DOCUMENTS

| 2237445 | 2/1974 | Fed. Rep. of Germany | 350/96.21 |
| 2602661 | 7/1977 | Fed. Rep. of Germany | 350/96.21 |
| 2800930 | 7/1978 | Fed. Rep. of Germany | 350/96.21 |

*Primary Examiner*—Stewart J. Levy
*Attorney, Agent, or Firm*—Neuman, Williams, Anderson & Olson

[57] ABSTRACT

A cable clamp particularly adapted for use in connection with optical fiber cables is provided. The clamp comprises twin hermaphroditic half portions which intermate and are pivotally movable relative to each other to define two sets of clamping jaws which open and close simultaneously as a result of a scissorlike pivot connection. A locking band such as a threaded nut locks the jaws at one end of the clamp together to securely engage an optical fiber cable sheath and simultaneously to secure the optical fiber of such cable at the opposed end. Transverse slots may be disposed in the clamp body portions enabling strength members of an optical fiber cable to pass therethrough and be clamped to a clamp body portion by a locking nut surface or the like.

26 Claims, 12 Drawing Figures

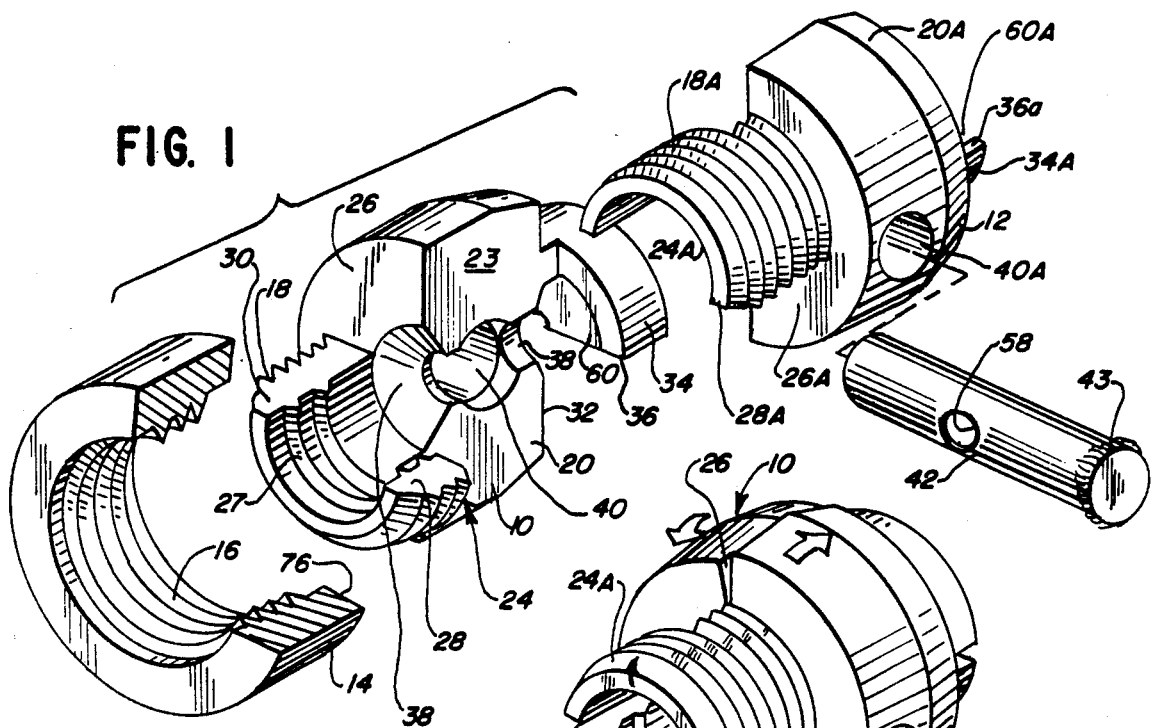
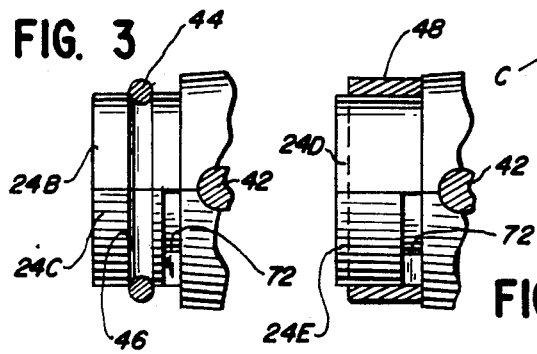
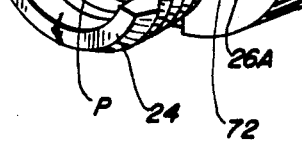
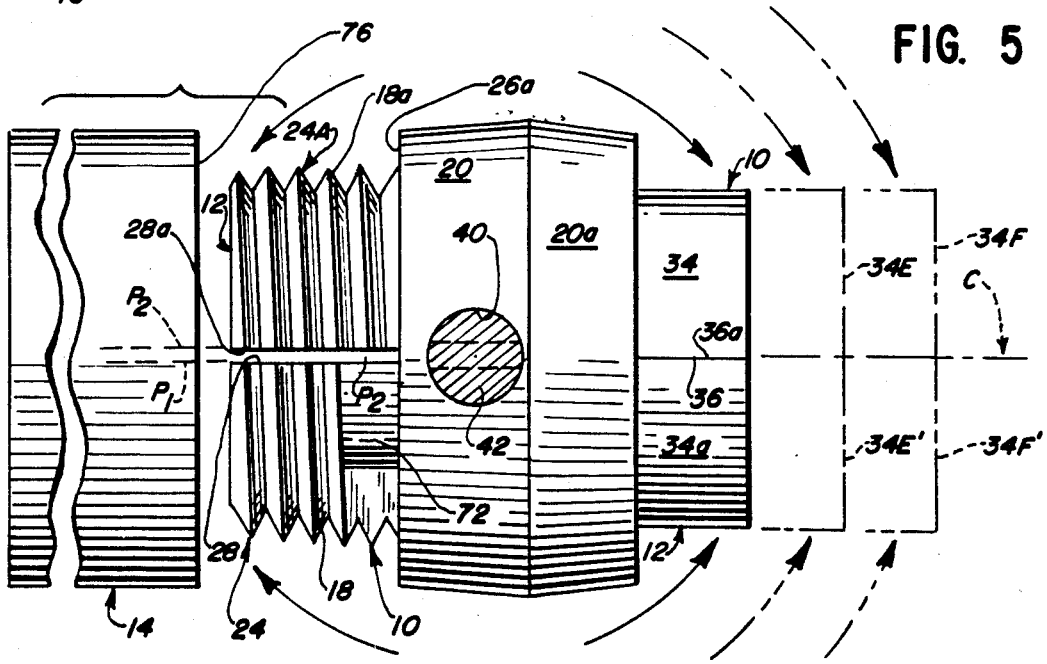

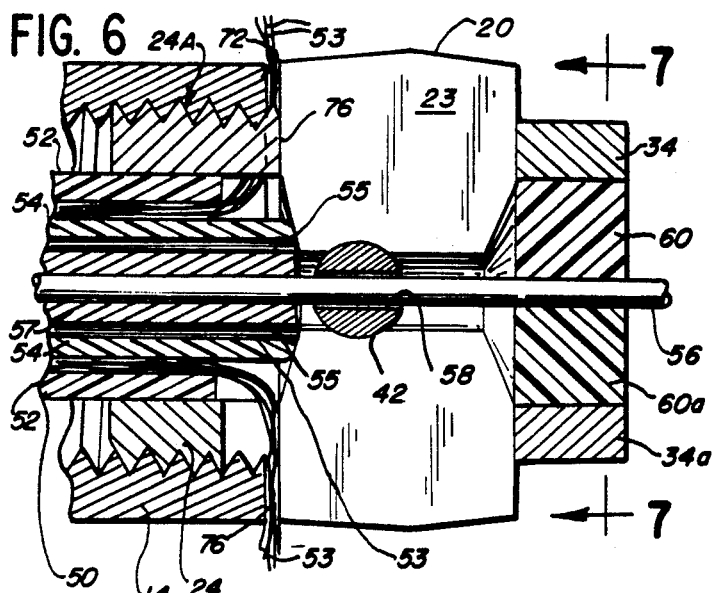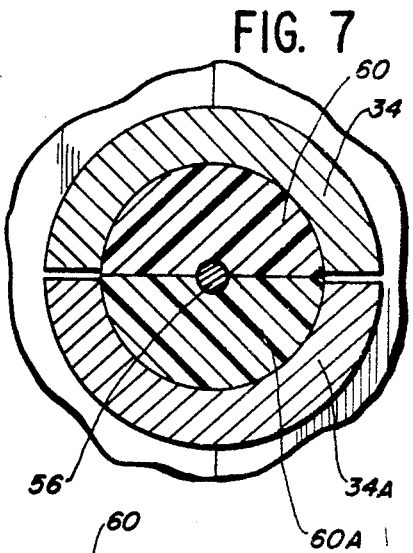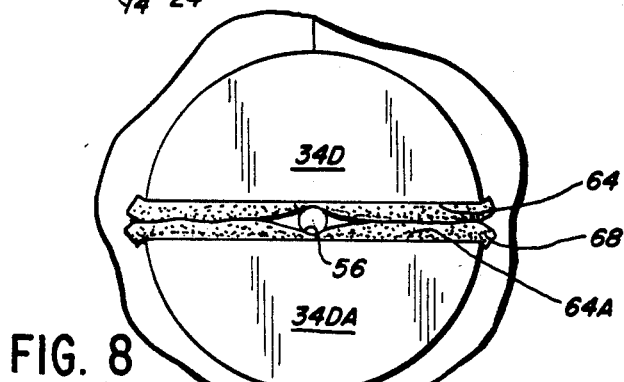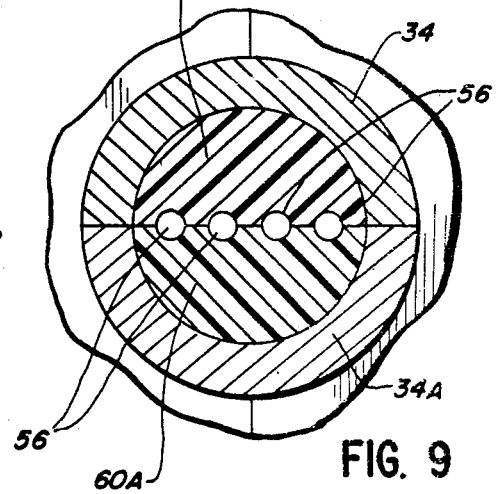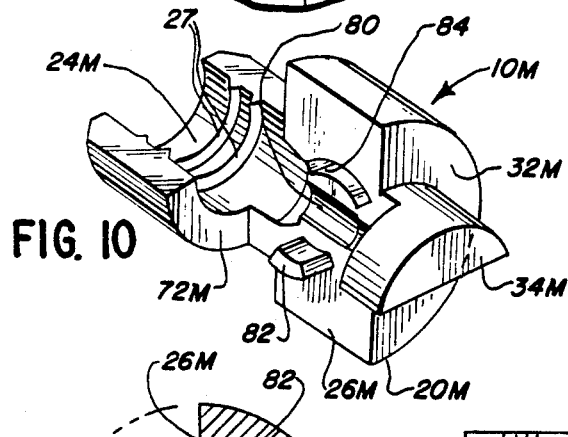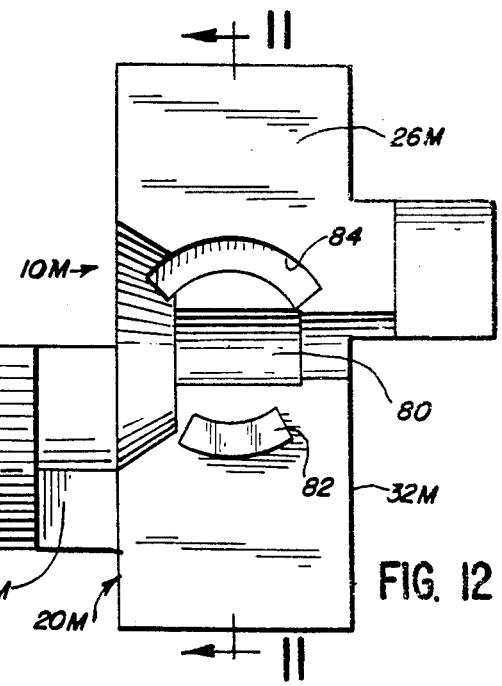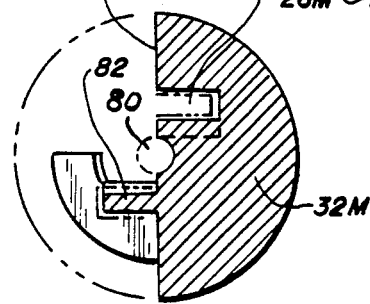

CLAMP CONSTRUCTION

This invention relates to a cable clamp, and particularly to a clamp adapted to securely engage both the other sheath and inner glass fiber of an end portion of an optical fiber cable. Double sheath-fiber clamping action is effected with the provided clamp construction.

In the prior art a cable jacket was clamped between two, tapered, split-collar halves by a screw nut or the like which urged the clamp halves together about the cable outer sheath. Thus, only the outermost cable covering was securely clamped in position.

The provided clamps of this invention may be incorporated in plug and receptacle portions of an optical fiber connector for effecting an optical signal transmissive connection between the ends of optical fibers.

One typical optical cable construction comprises an innermost glass optical fiber surrounded by a series of three concentric sheaths having strength members or reinforcing fibers interposed adjacent sheaths. The strength members may comprise plastic filaments for providing the cable construction with desired tensile strength. The embodiment of the invention described herein is shown and described in use with such a cable. However, the provided clamp will function to advantage with other cable constructions in which the glass fiber is centrally disposed within concentric sheaths of varying number with or without the presence of strength members. Also, the clamp may be designed for use with cables having multiple optical fibers. The presence of a layer of strength members enables a separate clamping function to be performed by the provided clamp as will hereinafter be described.

Clamping of an outer sheath does not prevent relative axial movement between the concentric cable sheaths or between the innermost optical fiber which is normally glass and the surrounding sheaths in most optical fiber cable constructions, as the presence of the strength members functions as a lubricant. In addition, the plastic sheaths will exhibit cold flow characteristics if clamped in place, allowing the innermost glass fiber to readily move relative thereto.

It is an object of this invention to provide improved clamps for optical fiber cables and similar conductor cables.

It is a more specific object of this invention to provide a simple cable clamp construction which simultaneously clamps the outer sheath, the innermost optical fiber and interposed strength members of an optical fiber cable in fixed position, enabling a desired connection between ends of optical fibers so clamped to be efficiently made with a minimum of difficulty.

It is another object of this invention to provide a simplified clamp composed of an assembly of twin hermaphroditic clamp half portions which are readily assembled in a time interval less than that heretofore expended in similar clamping applications. As the clamp half portions are of identical construction, manufacturing costs are desirably maintained at a minimum.

It is yet another object of this invention to provide a clamp construction which although capable of effecting three separate clamping engagements with concentric cable components requires a considerably lesser length of the engaged cable for clamping engagement than in the clamping constructions of the prior art.

It is yet another object of this invention to provide a cable clamp construction in which the relative clamping forces exerted on the clamped components may be closely regulated.

It is another object of this invention to provide a versatile clamp construction adapted for use with cables of varying construction.

It is yet another object of this invention to provide a novel clamp construction providing equalized, clamping pressure about the entire periphery of a clamped optical fiber assuring desired retention thereof against axial movement.

In one embodiment of this invention, twin clamp half portions are pivotally connected by means of a transverse pivot pin. The clamp halves and pivot pin which is apertured, define a longitudinal passageway therethrough in which an optical cable end portion may be received. Each clamp half portion has oppositely-facing, offset portions disposed on opposite sides of the pivot pin whereby the assembled clamp half portions are pivotally connected in a scissor-like relationship and define simultaneously closing and opening clamping jaws at opposed end limits. The clamping jaws at one clamp end limit are dimensioned to snugly clamp the entire optical cable diameter therebetween. The opposed, second clamp end clamping jaws are adapted to engage the innermost, signal-conveying, optical glass fiber. The second end clamping jaws may employ air-entrained plastic inserts to surround an optical fiber about its entire periphery and effectively restrain such engaged fiber against axial movement during such clamping engagement, as will hereinafter be explained in greater detail.

For a more complete understanding of this invention reference will now be made to the drawings wherein:

FIG. 1 is an exploded view of the components of one embodiment of a clamp construction made in accordance with the teachings of this invention;

FIG. 2 is a perspective view of the clamp elements of FIG. 1 in assembled relationship;

FIG. 3 is a fragmentary elevational view of one end portion of a modified clamp construction made in accordance with this invention illustrating an O-ring type clamping means for retaining the clamp half portions in assembled relationship;

FIG. 4 is a view similar to FIG. 3 illustrating a band means employed in an embodiment of the clamp construction made in accordance with the teachings of this invention for maintaining the half portions of the illustrated clamp construction in assembled relationship;

FIG. 5 is an enlarged side elevational view of the twin half portions of the clamp elements of FIG. 1 illustrated in assembled relationship about a pivot pin, the retaining band of FIG. 1 being fragmentarily illustrated in spaced relationship. FIG. 5 also illustrates in phantom line possible clamp-half modifications effected by extending the right hand portions of the illustrated clamp-half portions so as to effect a modified clamp action on centrally disposed engaged cable portions;

FIG. 6 is a fragmentary, transverse sectional view of one embodiment of a cable clamp made in accordance with this invention in engagement with an optical fiber cable;

FIG. 7 is a transverse sectional view taken on line 7—7 of FIG. 6;

FIG. 8 is a view similar to FIG. 7 illustrating a modified type of clamping jaw at one clamp end portion;

FIG. 9 is a view similar to FIG. 7 on which a plurality of optical fibers of a multi-fiber cable are clamped;

FIG. 10 is a perspective view of a modified hermaphoditic clamp element in which pivot means enabling mated elements to pivot relative to each other are integrally formed with such element;

FIG. 11 is a transverse sectional view illustrating the clamp hermaphroditic half elements of FIG. 10 in mating engagement; and FIG. 12 is an enlarged side elevational view of the clamp element of FIG. 10.

Referring now more particularly to FIG. 1, an exploded view is presented of various elements employed in forming one embodiment of a clamp construction made in accordance with this invention. In FIG. 1 clamp half portions 10 and 12 are of identical construction and they appear in longitudinally spaced relationship rotated 180° apart about a longitudinal axis on which the halves 10 and 12 are assembled. Also illustrated in FIG. 1 is a broken away locking or retaining ring 14 having female tapered threads 16 adapted to threadedly engage male threads 18 and 18A extending from central body portions 20 and 20A of the halves 10 and 12 respectively. The halves 10, 12 are illustrated in the assembled relationship in FIG. 2 in open position.

It will be noted from FIG. 1 that the male threads 18 are formed about the exterior periphery of semicylindrical projection 24 extending from planar face 26 of the central body portion 20 of the clamp half 10. Cylinder edges 28 and 30 lie in a horizontal plane P1 (FIG. 5) slightly offset below from central longitudinal axis C (see FIGS. 2 and 5) of passageway P defined by the clamp elements in the assembled position of FIG. 2 or in a plane coincident therewith. Edges 28A and 30A of clamp jaw 24 lie slightly above axis C to provide additional inter-jaw space in which the optical fiber cable periphery will be engaged.

Extending from end surface 32 of central body portion 20 of clamp half 10 is a C-shaped semicylindrical projection of half ring 34 having a resilient insert 60 and opposed terminal edge surfaces 36 which lie in a plane (see FIG. 5) disposed substantially coincident with central passageway axis C1. It will be noted from FIG. 1 that the terminal edges 36 of the half ring 34 face in a downwardly direction opposite to the upwardly facing direction of end surfaces 28 of semicylindrical projection 24 of the clamp half 10 therein, having insert 60A. Also, the terminal edges 28, 30 and 36 are substantially normal to the intervening diametral face 26 of the central body portions 20.

It will be further noted from FIG. 1 that in addition to opposed flared ends 38 of the relieved central portion of the clamp half portion 10 there is a transverse aperture 40 extending at right angles to the central axis passing through the flared end openings 38 of the body portion 20.

Clamp twin half 12 has structural features which are identical with the above-described structural features of clamp half 10 and bear the same identifying numeral in the various figures of the drawing together with the subscript A.

In the normal course of assembly of the clamp halves 10 and 12 of FIG. 1, the halves are intermated by butting the planar surfaces 23-23A (surface 23A being hidden in FIG. 1) of the half body portions 20, 20A with the corresponding cylinder and ring ends in abutting or adjacent relationship. Pivot pin 42 is transversely inserted through aligned apertures 40 and 40A of the clamp halves 10 and 12. The pin 42 may be knurled as at 43 at one end to effect a press fit with one clamp half and present relative movement therewith. Such press fit will ensure desired location of pin aperture 58 in passageway P. In such mated relationship the clamp half portions will assume the assembled condition illustrated in FIGS. 2 and 5. As an alternative construction, the pin may also be keyed to one clamp half to rotate therewith.

It will be noted from FIG. 5 that in a position of clamp half assembly with the assemblying pivot pin 42, distal edges 36A of the half ring 34A of the clamp half 12 will also lie in the plane of central axis C. Distal edges 28A of the semicylindrical threaded projection 24A of the clamp half 12 may be spaced in a plane from axis C as are edges 28 for the reason above given.

FIG. 2 illustrates the clamp halves 10–12 in open position for receiving an optical fiber cable to be clamped. The maximum open position of the opposed jaws 24–24A and 34–34A is determined by stopping engagement between planar clamp half surfaces 26–26A with projecting clamping jaw portions of the mated clamp halves. FIG. 2 illustrates the scissorlike action whereby the opposed clamping jaws simultaneously open; FIG. 5 illustrates the ability of such jaws to simultaneously close.

It will be noted from FIG. 5 that if a cable is passed through the left end of the passageway P defined by the opposed threaded hemispherical clamp portions 24 and 24A, and the latter portions were moved toward each other about pivot pin 42, a clamping engagement will be exerted on a peripheral portion of an interposed cable. Raised ribs 27 formed on the inner arcuate surfaces of clamp portions 24, 24A assist in preventing relative movement between the engaged cable and the closed clamp jaws 24, 24A.

It will also be noted from FIG. 5 that inasmuch as the half portion 34 is integrally formed with threaded semicylindrical portion 24 of the clamp half 10, as the clamp cylindrical portion 24 approaches the half cylindrical portion 24A of clamp half 12, simultaneously ring portion 34 is pivoted downwardly in FIG. 5 to approach ring portion 34A of clamp half 12. Thus clamping action is simultaneously effected at opposed clamp end portions defining the end limits of the passageway P passing through the clamp assembly of FIGS. 2 and 5. Similarly, if it is desired to release the opposed clamping jaws of the clamp halves defined by the semicylindrical portions 24 and 24A at one end and the semi-ring portions 34 and 34A at the opposite end, the two clamp halves are pivoted away from each other simultaneously at opposed ends about the pivot pin 42.

A means for urging the semicylindrical threaded portions 24 and 24A of the clamp halves 10 and 12 together may comprise the internally threaded ring 14 illustrated in FIGS. 1 and 5. The ring threads 16 as well as the clamp half threads 18 and 18A may be tapered. As the ring 14 is threaded home about the threads 18 and 18A, clamp half portions 24 and 24A are urged together into clamping engagement with a cable member disposed therebetween.

It should be appreciated that the semicylindrical clamping portions 24 and 24A need not be externally threaded for purposes of engaging a means urging the same together, but rather the half cylinder clamping jaws 24 and 24A may have a peripheral groove 46 as illustrated in the embodiment of FIG. 3 in which an O ring 44 may be disposed for clamp half jaw portions 24B and 24C together. As another alternative, a flat resilient band 48 may be snugly disposed about the periphery of clamping, semicylindrical portions 24D and 24E as illustrated in FIG. 4.

The design of the provided clamp construction provides desired resulting clamping force at clamping ring portions 34 and 34A by predetermined location of the distance of such clamping jaws from the fulcrum pivot point 42. Assuming that the interval between the clamping ring portion 34 of clamp half 10 and pin 42 were extended to the length 34E, and similarly assuming that the interval between clamping ring portion 34A of the clamp half 12 and pin 42 were similarly extended to the length 34E' as illustrated in FIG. 5, the force exerted by such clamping jaws would be proportionately decreased with the increased jaw distance from the fulcrum 42. Such decreased force would result from the increased lever arm, assuming that the clamp jaw ends 24 and 24A remained unaltered as illustrated in FIG. 5. The extension of the jaw 34 to the length 34F' would provide lesser clamping force due to the greater distance from the fulcrum 42; matching clamping jaw 34F' of the clamp half 12 would be similarly extended. It is thus seen that the clamp hermaphroditic half portions comprise intersecting lever arms arranged about a pivot pin in scissorlike fashion. The force applied at the lever ends or jaws opposed to those end jaws at which the force is applied is dependent upon the distance from the fulcrum pivot 42. By pin location relative to the opposed jaws the relative force exerted may be precisely controlled.

FIG. 6 is a transverse sectional view illustrating the assembled clamp components previously described in clamping engagement with an optical fiber cable 50. Cable 50 comprises an outer sheath 52 defining its maximum diameter, and strength members 53 comprising filaments of high tensile strength interposed the outer sheath member 52 and an intermediate sheath 54. A second annulus of strength members 55 is disposed between sheath 54 and innermost sheath 57. The cable is of a type sold under the brand name Siecor by Siecor Cables Inc. of Horseheads, N.Y. in which an optical fiber 56 which may be approximately five-thousandths inch in diameter is disposed. As above mentioned, the optical fiber 56 in cables such as illustrated cable 50 is relatively movable with respect to the concentric sheaths and strength members. It therefore is desired in clamping arrangements of such optical fiber cables to not only effect a clamping action on the outer cable periphery but in addition to effect a clamping action on the innermost optical fiber such as fiber 56 itself without damage thereto.

After the appropriate stripping of a length of overlying sheaths 52, 54 and 57 as well as lengths of strength members 55, the exposed filament 56 may be inserted through the aperture 58 of the pivot pin 42 and then between plastic inserts 60 and 60A secured to the inner periphery of the opposed clamping rings 34 and 34A of the clamp half portions 10 and 12 respectively. In such a clamping arrangement fixed, precise location of the optical fiber is assured. Movement of the fiber relative to the enveloping clamp and resulting deterioration of a connection which may have been made between the ends of a pair of optical fibers is avoided. Thus in FIG. 6 the clamping semicylindrical jaws 24 and 24A are urged together by enveloping, threadedly engaged ring 14 into gripping engagement with the outer sheath 52 of the optical cable 50. However, the innermost optical fiber 56 may normally, readily axially move relative to the concentric sheaths and strength members 54. The provided clamp prevents such undesired relative movement by clampingly engaging not only the outermost optical cable periphery (at the left end in FIG. 5) but in addition the fiber 56 itself.

It will be noted from FIG. 7 that plastic inserts 60 and 60A completely surround the glass filament 56, frictionally engaging the same and exerting a uniform "hydraulic-like" pressure about the entire periphery of the optical fiber 56 traversing the thickness of the plastic inserts 60 and 60A. As a result of this desired clamping engagement, the fiber is securely locked in place and prevented from axial movement relative to the clamp. The plastic inserts 60 and 60A are securely adhered to the inner peripheral surfaces of the half rings 34, 34A and may, for example, comprise elastomers which may have entrapped air to render the same readily conformable to the peripheral configuration to the optical fiber. Such resultant gripping action obviates any possibility of crushing pressures being exerted on the periphery of the fiber 56 normally formed of glass. Excessive pressures could detrimentally alter the light-conveying characteristics of such fibers. Such loss may be occasioned by causing molecular flow within the fiber or crushing of the fiber 56 so as to deleteriously affect its light-conveying ability. By way of example, cable 56 may be of a type sold under the brand name Siecor by Siecor Cables, Incorporated of Horseheads, N.Y.

Obviously other configurations for the fiberclamping jaws may be employed in the provided clamp with a large variety of inserts or coatings disposed in or on the jaws for effecting desired gripping engagement with the fiber 56. The material of fabrication of the clamp halves or clamping a jaw portions, may be a metal or one of a variety of plastics.

Thus, as an alternative to the use of the plastic inserts 60 and 60A of FIGS. 6 and 7, the clamping rings 34, 34A and their plastic inserts 60, 60A may be substituted by solid disc halves 34D and 34DA (see FIG. 8). Secured to the diameter-defining edges 64A and 64 of the clamping halves 34DA and 34D, respectively are layers of adhesive-coated plastic tape 68 the thicknesses of which are adequate to serve as a positive stop preventing pressures from being exerted on the interposed fiber 56 adequate to effect undesired flow or fracture thereof which could result in a deterioration in light-conveying characteristics. The fiber 56 is securely restrained between the tape 68 against axial movement.

If the optical fiber 56 is not readily moved relative to the innermost plastic sheath 57, jaws 34A of the clamp halves 10 and 12 of FIG. 1 may be altered in configuration or design so as to snugly engage the periphery of the optical cable inner sheath 57.

An additional clamping action, between the inner planar surface 76 of threaded ring 14 and planar surfaces 26 and 26A of the center housing portions 20 and 20A of the clamp halves 10 and 12, respectively is carried out when the strength fibers 53 interposed the intermediate and outermost sheaths 54 and 52 of the illustrated optical cable construction are led through gaps 72 in sections 24, 24A as clearly seen in FIGS. 4 and 6 of the drawing. The strength members 53 comprising plastic filaments are led through the openings 72 and then securely clamped between the abovementioned surfaces 76, and 26 and 26A when the ring 14 is seated against the center sections 20, 20A. Inner strength members 55 interposed sheaths 54 and 57 may be similarly engaged if additional securement of the clamped cable portion is desired. If not, they are trimmed adjacent clamp opening 72, as illustrated. The terminal ends of the strength members 53 may then be trimmed so as to not extend beyond the periphery of the clamp assembly.

Accordingly, in addition to the cable and fiber clamping actions above described and which are carried out at the opposed ends of the provided clamp construction, a third clamping action may be effected on the strength members normally found in an optical cable of the type intended to be employed with the provided clamp.

FIGS. 10 through 12 illustrate a modified hermaphoditic clamp element 10M adapted to mate with itself so as to form a clamp which functions in the same manner as the clamps above described. The clamp element 10M also includes integral hermaphroditic pivotal interconnection feature developed by others, and is disclosed to illustrate another mode of practicing the invention of this application. This embodiment avoids the need for a separate pivot pin and thus in at least some instances is preferred to the embodiments of FIGS. 1–9.

The modified hermaphroditic clamp half 10M is of the same basic construction as the clamp halves above described with the exception that means for effecting pivotal movement between mated halves is formed integrally with each clamp element 10M. Thus there is no need for the employment of a discrete pivot means such as the pivot pin 42 illustrated in FIG. 1. Extending from planar surface 26M of central body portion 20M of the clamp half 10M is a projecting stud member 82 of arcuate sectional configuration as is more clearly seen from FIG. 12. Stud 82 is disposed on one side of a longitudinally extending passageway 80 which extends coaxially through the central body portion 20M. Disposed on the opposite side of passageway 80 from the projecting stud 82 is a complimentary recess 84 adapted to receive a projecting stud 82 of a cooperating clamp half identical to the construction of clamp half 10M illustrated in FIG. 10.

It will be seen from FIG. 12 that the arcuate stud 82 and aperture 84 describe a cylinder transverse to the passage 80 and provide a central transverse pivot axis intersecting the center axis of passage 80. The aperture 84 is of a slightly greater arcuate width than the width of the arcuate stud 82 (see FIG. 11) to permit pivotal movement between mated halves. Thus, the joined sections pivot about the noted transverse axis to effect their desired scissorlike action. Modified clamp elements 10M when in the mated condition will have the distal edges of the projecting cylindrical portions disposed in substantially parallel or radial planes similarly to the distal edges of the clamp half semicylindrical elements illustrated in FIG. 5.

Thus the clamp elements 10M may pivotally move on one another about the noted transverse axis for purposes of effecting clamping and release engagements with optical cable members and their elements. Such action simultaneously effects a plurality of clamping actions with both the cable sheath of an optical cable and the innermost optical fiber itself in the manner described above with respect to FIGS. 1–8.

The modified clamp half 10M comprises a solid semicylindrical projection 34M which extends from planar face 32M defining one face of central body portion 20M as in the embodiment of FIG. 8. Extending from the opposed planar face of the central body portion is the semicylindrical projection 24M which may be of any suitable design e.g., threaded the same as elements 24 and 24A previously described with respect to clamp halves 10 and 12 or of a construction for effecting clamping engagements by means of annular rings or bands such as are also illustrated in FIGS. 3 and 4. Similarly, the solid semicylindrical projection 34M may be of the construction illustrated in FIGS. 6, 7 and 8 of the drawings, or possess other structural configurations with or without fiber-securing inserts. The clamp half 10M may be formed of metal, or a plastic composition requiring no insert or additional elements for providing a desired gripping engagement with an engaged optical fiber.

The optical fiber to be clamped passes from a cable sheath adapted to be clamped between the cylindrical portions 24M to a location between and across the planar surfaces of the clamping semicylindrical jaws 34M. If the clamping surface of the jaw 34M is not formed of a material which is itself compressible, it may have disposed thereon a tape element such as is illustrated in FIG. 8 or be otherwise coated with an adhesive or plastic material assuring a desired embedding matrix for the engaged fiber member. Also, clamp half 10M may be provided with a relieved edge portion 72M defining an exit window for strength members of an optical fiber cable whereby the latter strength members may be securely clamped between the cyindrical portion 24M and a locking band such as face 76 of a threaded nut 14 or band 48 as illustrated in FIGS. 1 and 4.

In employing the modified clamp half structure of FIGS. 10–12 there is no necessity for employing transverse apertures such as aperture 40 of FIG. 1, for purposes of receiving a pivot pin as no pivot pin is necessary. The absence of a pivot pin 42 renders the assembly of the clamp halves 10M a relatively easy matter as there is no need for assembly with a third element. In addition, the step of aligning the aperture 58 of the pin 42 with the clamp passageway P is eliminated as the integral stud and recess 82 and 84 respectively in no way interfere with the longitudinal passageway for the optical cable fiber.

It is seen from the foregoing that clamps provided in accordance with this invention are of extremely simple construction. The clamp is formed from hermaphroditic, twin half portions pivotally joined to one another between the two pairs of clamping end portions. The provided clamp is extremely versatile in operation, being adapted to readily secure either sheath portions of an optical cable or a sheath portion and the innermost optical fiber. Cable constructions may vary from that illustrated; thus the number of concentric sheaths and strength fiber layers may vary from those of the illustrated cable 50. The provided clamp is readily adaptable to varying cable constructions by virtue of its adjustable jaws at opposed ends. The engagement of the optical fiber by the provided clamp is in such manner so as to ensure the absence of damage thereto. The provided clamp construction may be readily assembled with and disassembled from an engaged optical fiber cable portion and requires the preparation of only a relatively short length of the engaged cable portion in order to be in secure engagement therewith.

Although the foregoing description has referred to optical cables having a single optical fiber, the provided clamp will, of course, work to advantage in multi-fiber cables. Thus, in FIG. 9 four fibers are retained between clamp jaws 34–34A having resilient, plastic inserts 60–60A therein. When employed with multi-fiber cables the clamp passageways must, of course, be of adequate size to allow passage of the fibers and slots 72 of adequate size to allow passage of the desired number of strength filaments for desired clamping action.

The provided clamp construction is adaptable for use not only with an optical fiber cable but also has application for engagement with corresponding elements of electrically conducting cables such as coaxial cables wellknown in the art. Clamps employed in such applications would be formed at least in part of dielectric material. It is believed that the foregoing description has made apparent a number of modifications which fall within the ambit of the invention disclosed. Accordingly, this invention is to be limited only by the scope of the appended claims.

What is claimed is:

1. A clamp particularly adapted for clamping in fixed relation concentric elements of an optical fiber cable or the like, comprising clamp portions pivotally connected to one another in a scissorlike manner; opposed ends of said portions defining pairs of clamping jaws which are simultaneously movable into clamping and release positions relative to one another in the course of pivotal movement of said clamp portions; said clamp portions defining a passageway extending between said clamping jaw pairs.

2. A clamp as in claim 1 wherein said clamp portions are identical to one another.

3. A clamp as in claim 1 wherein said clamp portions are hermaphroditic clamp halves and are pivotally connected with one another for pivotal movement in a scissorlike manner on a transverse axis located between said opposed ends; said clamp portion defining a longitudinal passageway through such clamp.

4. A clamp as in claim 3 wherein said clamp portions define a longitudinal passageway through said clamp, and wherein said transverse pivot axis intersects said passageway.

5. The clamp of claim 4 in combination with means engaging one jaw pair for urging the jaws of said engaged one pair into tight clamping engagement.

6. The clamp of claim 5 in which said clamping jaws of each body portion extend from an interposed body section and an opening is disposed in each of said clamp portions communicating with said passageway, said opening being so located whereby a flexed reinforcement element of a cable disposed in said passageway may pass through such opening and be fixedly clamped between an end surface of the jaw urging means and said clamp body sections.

7. A clamp as in claim 6 wherein said opening extends radially through the respective jaw sections and is disposed adjacent the respective body sections.

8. A clamp as in claim 4 wherein said passageway is coaxial with said clamp.

9. A clamp as in claim 3 in which the intervals between said clamping jaws at opposed clamp ends differ when said jaws are in the clamping position whereby cable elements of differing diameter may be simultaneously clamped in place thereby.

10. The clamp of claim 1 in which one of said clamp jaw pairs comprise opposed jaws having clamping edges defined by a resilient elastomer adapted to impart substantially equal gripping pressure about the entire periphery a cylindrical body placed between said clamping edges.

11. The clamp of claim 10 in which each clamping jaw having said elastomer edge comprises a cylindrical housing of rigid material in which a cylindrical section of resilient elastomer is disposed.

12. The cable clamp of claim 1 in which a corresponding clamping jaw of each clamp half has a central portion of resilient plastic.

13. In combination a clamp comprising hermaphroditic clamp halves pivotally connected in scissorlike manner; clamping jaws defining opposed ends of said clamp halves; said clamp defining a continuous passageway therethrough extending between said clamping jaws; a cable of concentric elements having a peripheral portion fixedly disposed between one pair of said clamping jaws; transverse openings in said clamp halves interconnecting said clamp continuous passageway with the clamp exterior; a first concentric cable element passing from the clamped cable portion along said clamp passageway between the clamping jaws spaced from said cable; a second concentric cable element passing through said clamp transverse openings; and means for simultaneously urging the jaws of one clamp and together and locking a portion of said second concentric cable element passing through said clamp transverse openings to portions of said clamp halves interposed said clamping jaws.

14. The combination of claim 13 in which said jaws of each clamp half extend from opposed faces of a central body portion, and the simultaneous urging means comprises a threaded nut; the end of said nut locking the second cable element against a face of said central body portion.

15. A cable clamp comprising twin halves configured for intermating into an assembly having a longitudinal passageway therethrough; means engaging said halves in a direction transverse to said passageway for retaining said halves in an assembled condition and comprising a pivot means about which said halves may pivot in scissorlike relation; opposed ends of said halve assembly defining clamping jaws which simultaneously approach each other and depart from each other in the course of pivotal movement of said clamp twin halves in opposite directions; said pivot means having an aperture therethrough in alignment with said passageway.

16. The cable clamp of claim 15 in which each of said clamp twin halves comprises a central body portion of substantially semicylindrical configuration having a central hollowed-out portion defining a portion of said longitudinal passageway; a transverse opening formed in said body portion intersecting said hollowed-out portion, and pin means snugly received in said transverse opening of said twin halves defining said pivot; said pin means having a transverse opening therein for alignment with said clamp longitudinal passageway.

17. The cable clamp of claim 15 in which each of said twin halves comprises a central body portion; one face of said body portion being integrally formed with a projecting semi-ring portion; a second face of said body portion being integrally formed with a substantially semicylindrical projecting portion; the terminal ends of said ring and semicylindrical projecting portions facing in substantially opposite directions and lying in spaced parallel planes; said planes being at substantially right angles to the faces of said central body portion.

18. The cable clamp of claim 17 in which a transverse opening is formed in said central body portion of each twin half transversely to said longitudinal passageway, and a pivot pin disposed therein for maintaining said pivot means comprises halves in assembled relation.

19. The cable clamp of claim 17 in which said projecting semicylindrical portion has a relieved edge portion spaced from the face end of the central body portion with which said projecting portion is integrally formed.

20. The cable clamp of claim 19 in which said semicylindrical portion of each clamp twin half is exteriorly threaded, and an interiorly threaded ring engages the same for urging said twin half portions together.

21. The cable clamp of claim 16 in which said hollowed-out portion of each clamp half portion is beveled at opposed ends and defines a clamp central passageway.

22. In combination, an optical fiber cable comprising concentric sheaths spaced apart by interposed, parallel strength members; an optical fiber disposed in the innermost sheath and extending therefrom at one end; a clamp having spaced pairs of clamping jaws disposed at opposed clamp ends extending from a central clamp body portion, and clampingly engaging concentric elements of said cable, said jaws comprising opposed ends of clamp elements pivotally connected in a scissorlike manner whereby said opposed pairs of jaws are simultaneously movable into cable gripping and releasing positions during pivotal movement of said clamp elements; the interval between the jaws in gripping position being such as to enable such jaws at one clamp end to securely engage the optical fiber cable outer sheath disposed therebetween; the interval between the clamping jaws at the opposed clamp end in gripping position being such as to enable said jaws at said opposed end to securely engage said optical fiber disposed therebetween; said clamp elements defining a passageway extending through said clamping jaws through which said optical fiber passes.

23. The combination of claim 22 in which said clamp elements are of identical structure; each element having a transverse opening through which cable strength members are passed; and in combination with means urging said jaws at said one clamp end together; said urging means also clamping strength members passing through said transverse openings against said clamp central body portion.

24. A clamp element adapted to mate with a duplicate of said element in a scissorlike manner comprising a central body portion; said central body portion having a substantially planar width defining face and having a central hollowed out portion disposed in said planar face and extending across the width of said body portion; said body portion having spaced faces on opposite sides of said planar face; a projecting clamp jaw extending from said spaced faces of said central body portion; said jaws facing in opposite directions relative to the central longitudinal axis of said element; one-half of one end of each clamping jaw being integrally formed with the body portion face from which projecting; the remaining one-half of said one end being spaced from said central body portion.

25. The clamp element of claim 24 in which one of said projecting clamp jaws is exteriorly threaded and said central body portion has a transverse aperture therein which intersects with said central hollowed out portion.

26. The clamp element of claim 25 in which one of said clamp jaws is relieved at said spaced one end portion.

* * * * *

UNITED STATES PATENT AND TRADEMARK OFFICE
CERTIFICATE OF CORRECTION

PATENT NO. : 4,247,163
DATED : January 27, 1981
INVENTOR(S) : Robert Ellsworth Lumpp and Mark Margolin It is certified that error appears in the above–identified patent and that said Letters Patent are hereby corrected as shown below:

Col. 1, line 6, "other" should read -- outer --

Col. 4, line 1, "present" should read -- prevent --

Col. 6, line 28, "fiberclamping" should read -- fiber-clamping --

Col. 6, line 63, "abovementioned" should read -- above-mentioned --

Col. 9, line 7, "wellknown" should read -- well-known --

Col. 10, lines 65, 66 "and a pivot pin disposed therein for maintaining said pivot pin comprises halves in assembled relation" should read -- and said pivot means comprises a pivot pin disposed therein for maintaining said halves in assembled relation. --

Signed and Sealed this

Seventeenth Day of August 1982

[SEAL]

Attest:

Attesting Officer

GERALD J. MOSSINGHOFF

Commissioner of Patents and Trademarks